Nov. 24, 1959  J. E. DOBSON  2,913,827
SURVEYOR'S TARGET
Filed Feb. 13, 1956
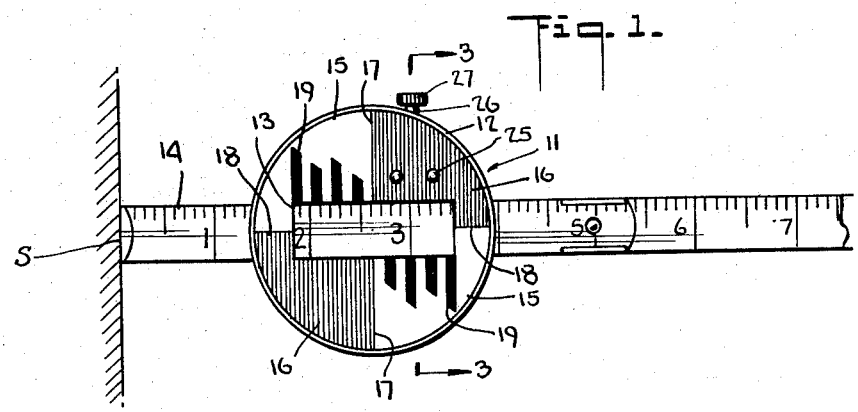
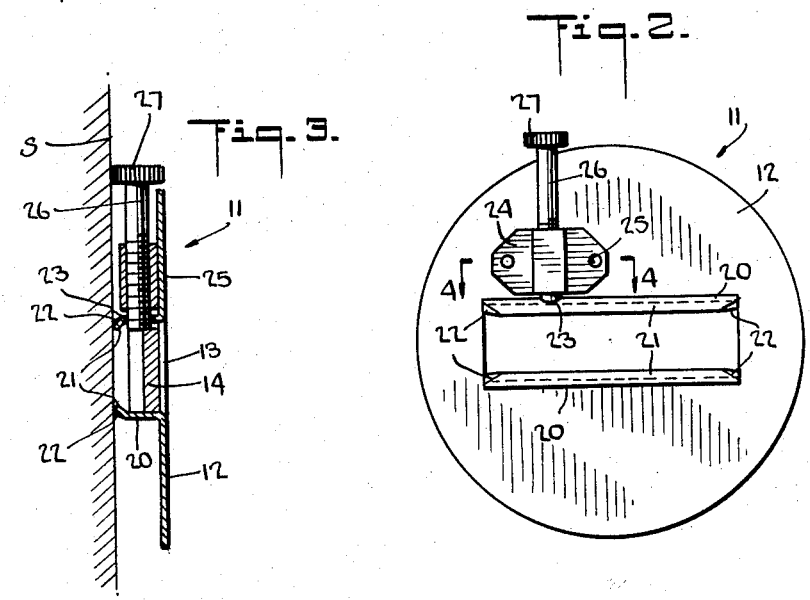
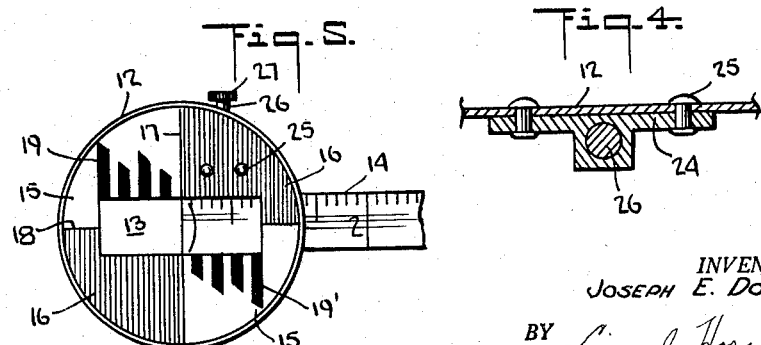
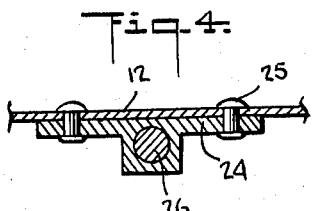
INVENTOR:
JOSEPH E. DOBSON
BY Leonard Horn
ATTORNEY.

United States Patent Office

2,913,827
Patented Nov. 24, 1959

2,913,827

SURVEYOR'S TARGET

Joseph E. Dobson, Baldwin, N.Y., assignor to Keuffel & Esser Company, Hoboken, N.J., a corporation of New Jersey Application February 13, 1956, Serial No. 565,016

2 Claims. (Cl. 33—74)

The present invention relates to a novel surveyor's target especially suited for use in combination with an engineer's folding rule at construction sites.

Most structural elements of any construction job are placed to a specific line and elevation (grade) as determined by the designer and set forth on the construction drawings. The lines and grades thus specified must be established at the job site by a field engineer or surveyor.

The use of surveying instruments enables the surveyor to transfer existing lines (usually property lines) and existing elevations (usually coast and geodetic, city or county bench marks) onto the job site. Further transfer of these lines and grades is accomplished as the continuing process of construction requires the location of subsequent structural elements.

Prior to "fixing" the structural elements, i.e., pouring concrete into readied forms, riveting, welding or bolting of structural steel, the location of the structural element or its form, although previously established must be checked; likewise, when the "fixing" has been completed the final location of the structural element must be checked to insure that it is exactly located as stipulated in the construction drawings.

The work of the line and grade engineer and the surveyor falls principally into two categories: (1) giving "sight," or (2) reading "sight." In both cases the engineer's transit is set up colinear to a known property line, building line or is offset parallel therefrom or when employed as a level at a known elevation.

When giving "sight," the instrument man through the use of hand signals by voice or other means directs the movements of the "sight" held by the rodman until the crosshair in the transit is colinear with the "sight." When this registration is completed the instrument man so signals to the rodman, who in turn marks a crows foot, or other similar line designation on the desired line thereby effecting a transferral of a line or grade, i.e., giving "sight."

When reading "sight" the rodman holds the "sight" at a point on the surface to be checked and the instrument man "reads" the point on the "sight" which is colinear with the crosshair in the transit. In this manner the existing location of a surface may be checked.

In giving "sight" as described above, the instrument man sights on an object, frequently the end of a six foot folding rule or a predetermined graduation thereon, and as described above instructs the rodman to move the rule one way or another until the rule's end or said graduation thereon is registered with the crosshair of the transit. On sights exceeding one hundred feet or in the darkened confines of a building the "sight" graduations become indistinct, or in the case of sighting on the end of the rule in bright sunlight, the metallic tip sparkles prohibiting accurate sighting thereon. In all of these cases registration is difficult for the instrument man and oftentimes impossible. Now when the rodman has moved the "sight" within one inch of registration with the transit, many additional movements of the sight are frequently required to complete the registration because the exact distance to move the sight is unknown to the transitman due to his inability to see the minute graduations on the folding rule. It will be later shown how this invention eliminates these difficulties encountered by the instrument man in giving "sight," and how the final registration process may be expedited.

In reading "sight" the instrument is set up and the rodman holds the zero end of the "sight" (frequently the engineer's six foot folding rule) at the point whose line and/or grade is to be checked. The instrument man then reads the registration of the appropriate horizontal or vertical transit crosshair on the "sight." Having previously determined which rule reading would mean the point being checked was correct, the instrument man can compare these two values and determine by subtracting one from the other, the amount of error, if any. Frequently, however, in poor light, or when the sight distance exceeds 100 feet, the rule graduations are not plainly visible to the instrument man and the results are therefore more or less inaccurate, and sometimes unobtainable.

Most frequently the amount of the above defined error is one inch or less. It will later be shown how this invention facilitates reading "sight" and eliminates the inaccuracies encountered in so doing.

While the Philadelphia rod with attached target sometimes is suitable as a "sight" for work of this type, it is an unwieldy and heavy instrument and in many instances cannot be conveniently used, if used at all, in the narrow confines of most construction jobs. In practice, most construction engineers and many surveyors have merely used the conventional folding rule as "sight" and have used improvised targets, for example, the point of a pencil to sight upon. While these improvisations do away with the inconvenience of the Philadelphia rod, they in no way compensate for the lack of a suitable target, and frequently are time consuming and lacking in accuracy.

It is accordingly an object of the present invention to provide a target suitable for use with a conventional folding rule.

It is a further object of the invention to provide a target which will expose enough rule for substantially all purposes while providing auxiliary scale graduations more readily visible than the intermediate graduations on such rules.

Another object of the invention is to provide a target which can be securely held thereon without wobbling whether there is encountered a single rule thickness or a double rule thickness as at the joint between adjacent rule sections.

Yet another object of the invention is to provide a target which can be positioned to utilize even the end of the folding rule as a sight.

Another object is to provide a target which is light in weight and can thus be affixed at the end of an extended folding rule without collapsing the rule, and which may be used flush against any surface whereby to obviate error resulting from canting of the target away from the surface.

Other objects, within the purview of any invention, together with the precise nature of my improvements will be readily understood when the succeeding description and claims are read with reference to the drawing accompanying and forming part of this specification.

In said drawings:

Figure 1 is a view in front elevation illustrating my improved target set on the rule and the rule used for checking the distance of a point on an abutment from a building line;

Figure 2 is a view in rear elevation of the target detached and drawn to a larger scale;

Figure 3 is a view in transverse section taken on the line 3—3 of Figure 1;

Figure 4 is a sectional view of the clamp taken along line 4—4 of Figure 2; and

Figure 5 is a view in front elevation illustrating a slightly modified target set on zero at one end of the rule.

Referring now more particularly to the drawing, in Fig. 1 there is shown my new target 11 comprising a disc 12 preferably made of sheet metal such as aluminum, brass, or the like, and provided with an elongated rectangular window opening 13 of approximately the same width as an engineer's folding rule 14, the window 13 preferably being about the length of two main graduations on the rule, i.e., about two inches.

The face of the disc 12 is made up of two pairs of diametrically opposed quadrants 15, 16 meeting along perpendicular diameters 17, 18, adjacent quadrants preferably being of different color for ease of distinguishing the demarcation line. Two of the opposite quadrants 15 are provided with striped graduations 19 extending along the window 13, the graduations denoting eighths of inches, for example, or hundredths of a foot.

As seen in Figs. 2 and 3, the rear of the disc 12 is provided with a pair of guides 20 extending longitudinally of the window 13 on either side thereof, the guides preferably being formed by deforming of the material from the plane of the disc so that the deformation simultaneously forms both the window and the guides. The guides for the most part extend perpendicularly to disc 12 but the ends 21 remote from the window are deflected towards each other at an angle relative to the disc to hold the rule in place. The lateral extremities 22 of these ends 21 are flared outwardly to facilitate passage of the joints of the rule between the guides without binding. The spacing between the ends 21 and the plane of the disc 12 is slightly more than twice the thickness of the rule 14 so that it can accommodate the end of a rule section where adjacent sections overlap as shown in Fig. 3.

One of the guides 20 is provided with an aperture 23 adjacent one end thereof and a bracket 24 is affixed by rivets 25, or the like, to the rear side of the disc 12 in alignment with the aperture 23, the inside of the bracket 24 being threaded. A set screw 26 extends through bracket 24 and is provided with an enlarged knurled head 27. As seen in Fig. 3 the knurled head 27 is of such diameter that it projects into the plane of the disc 12 so that the screw 26 can be advanced through aperture 23 only until head 27 reaches and is stopped by the periphery of disc 12. At the left hand side, the diameter of the screw head 27 is such that it terminates in a common plane with the flared extremities 22 of the ends 21 of the guides 20. Consequently, when the rear of the disc is placed against a wall or other surface S, the surface is contacted by the flared extremities 22 and the screw head 27 so that the face of the disc 12 is maintained absolutely parallel to the surface S without canting or tilting.

Because the aperture 23 and bracket 24 are offset relative to diameter 17, it can be seen that the end of a rule can be aligned with diameter 17 while the rule is nonetheless securely held by the flattened nose of screw 26, the nose being of such diameter and being positioned so close to the disc 12 that it will bear against the rule whether a single or double thickness of rule is presented.

Referring now to the use of my invention, in reading "sight" for example checking a point on a surface S relative to a building line, the transit is set on the building line or a parallel offset of said line, the zero end of the rule 14 is placed against said surface and held horizontal, as shown in Figure 1, and the target set along the rule 14 so that the diameter 17 of the target is colinear with the division or graduation on the scale of the rule that gives the offset distance between the known transit line and the point to be checked if the point be offset correctly relative to the known transit line. The transit man is "reading sight" in order to determine how much the point being checked deviates from the point where it should lie. The man holding the rule 14 is merely holding the zero end against said point.

If a deviation does exist, and this deviation is one inch or less, as it frequently is, the transitman may determine the amount of said deviation by noting the number of auxiliary scale graduations or stripes between the diameter 17 of the target and the auxiliary scale graduations intercepted by the cross hair in the transit. The minute, frequently obscure, graduations of the folding rule are thereby entirely replaced by the stripes on the face of the target which are many times larger than those on the rule and thus clearly visible on "sight" of one thousand feet and more. If no deviation exists then this is noted immediately by the instrument man as the diameter 17 of the target will appear colinear with the cross hair of the transit.

In another use for similar purposes, the target is set at zero on the rule 14, as shown in Fig. 5, and the transit man is setting zero while the man on the rule is reading to the point being checked. In this manner a clearly distinct "sight" is presented to the instrument man even in the bright sunlight when the glint of the sun rays on the metallic tip of the folding rule might otherwise render the tip obscure to the vision of the instrument man, or on long sights when the tip of the rule might otherwise be indistinct.

In giving "sight" the target is set on the predetermined graduation on the scale of the folding rule which when related to the zero end of the rule is an amount equal to the normal distance between the line on which the transit has been set and the desired line to be set. The instrument man, as previously described, causes the rodman to move the rule until the diameter 17 is within one inch of registration with the transit cross hair. At this time, by noting the number of auxiliary scale graduations or stripes between diameter 17 and the transit cross hair, he can signal to the rodman the exact distance to move the rule in order to complete the registration. The minute graduations on the folding rule made indistinct by sight distances in excess of one hundred feet and frequently obscured by darkened confines of buildings are thereby entirely replaced as "sights" by the auxiliary stripes many times larger on the face of the target. Giving "sight," by causing registration of the cross hair in the transit with the diameter 17 of the target as the "sight" eliminates the inaccuracies resulting when the instrument man attempts such registration using for a "sight" the frequently indistinct graduations on the folding rule. In final registration, the instrument man can signal to the rodman the exact distance to move the "sight" in order to complete the registration thereby greatly expediting this process. In any case, registration becomes far less difficult.

In checking a point or points for elevation, with the transit used as a level, the rule 14 is used as a surveyor's rod, and the target set on the division of the rule that is the foresight of the setup to the point or points being checked for grade, if the point or points are at the desired elevation. Again in this use, as in any use of the target, the auxiliary graduations 19 provided on the scale may be used by counting the same from the focal point of the transit wires focused on the diameters 16, 17 and the intermediate graduations on the rule 14 may be disregarded.

Because of the light weight of the target it can be placed at the very end of the rule as shown in Fig. 5 and even if the rule is extended unsupported for three feet and more it will not be collapsed due to the target. It will also be noted that because of the angular disposition of ends 21 relative to the plane of disc 12, when the screw 26 is loosened the rule has a certain freedom of movement within the guides so that it will not jam when pushed or advanced through the guides.

The target of Fig. 5 is identical with that of Fig. 1 in all respects except that one of the sets of graduations 19 of the Fig. 1 target is replaced by graduations 19′, differing in width and spacing from graduations 19. One set may conveniently be eighths of an inch and the other hundredths of a foot.

Various changes and modifications may be made without departing from the spirit and scope of the present invention and it is intended that such obvious changes and modifications be embraced by the annexed claims.

What I claim is:

1. A disk target for use with a conventional rule of the type having graduations adapted to be read at close range with such graduations being indistinguishable at distances of 100 feet in poor illumination, said disk target divided into quadrants along two perpendicular diameters with one diameter adapted to extend in the direction of a rule, said disk being provided with an elongated window extending longitudinally in the direction of said one diameter and transversely of the other diameter, a pair of opposite quadrants being provided with coarse graduation stripes and extending perpendicular to a longitudinal edge of said window, the width of each graduation stripe being in the order of the space between graduations, guide means on the rear of said disk behind said window and defining a passage extending longitudinally in the direction of said window and communicating therewith, said passage being of a size to receive a rule in sliding relation to permit adjustment of the target and locate the window over selected graduations and numeric indicia on the rule, clamping means mounted on said target and engageable with a rule received in said passage to maintain the target in adjusted position whereby the heavy graduation stripes on the target may be read from a great distance in poor light with a telescope thereby avoiding strain in reading and inaccuracies in reading and recording the information sought.

2. In combination with a folding rule, a surveyor's target comprising a disc sub-divided on its face into quadrants along two perpendicular diameters, said disc being provided with a rectangular window extending longitudinally of one of said diameters and transversely of the other diameter, a pair of opposite quadrants being provided with striped graduations extending to said window, a pair of guides along said window and extending rearwardly of said disc, said guides each including a portion approximately twice the thickness of said rule projecting substantially perpendicularly from said disc and ending in a portion directed toward the corresponding portion of the other guide at an angle relative to said disc, extremities of said end portions being flared outwardly, one of said guides being provided in its perpendicular portion adjacent one end with an aperture close to said disc, a bracket on the rear of said disc and aligned with said aperture, and a set screw having an enlarged head, said screw extending into said bracket, said head being of such diameter that it projects forwardly into the plane of the disc and projects rearwardly of the disc to the same extent as said outwardly flared extremities of said angularly directed end portions of said guides, the parts of said head and of said guides furthest from said disc lying in a common plane parallel to said disc.

References Cited in the file of this patent

UNITED STATES PATENTS

| | | |
|---|---|---|
| 685,455 | Kinkead | Oct. 29, 1901 |
| 833,880 | Keuffel | Oct. 23, 1906 |
| 1,500,482 | Barrett | July 8, 1924 |
| 2,010,737 | Sheridan | Aug. 6, 1935 |